Feb. 6, 1951 J. A. MAURER, JR 2,540,626

IMPULSE RECORDING OPTICAL SYSTEM

Original Filed Aug. 2, 1940 5 Sheets-Sheet 1

INVENTOR
JOHN A. MAURER, JR.
BY Otto J. Nathanson
AGENT

IMPULSE RECORDING OPTICAL SYSTEM

Original Filed Aug. 2, 1940

5 Sheets-Sheet 2

INVENTOR
JOHN A. MAURER, Jr.
BY Otto J. Nathenson
AGENT

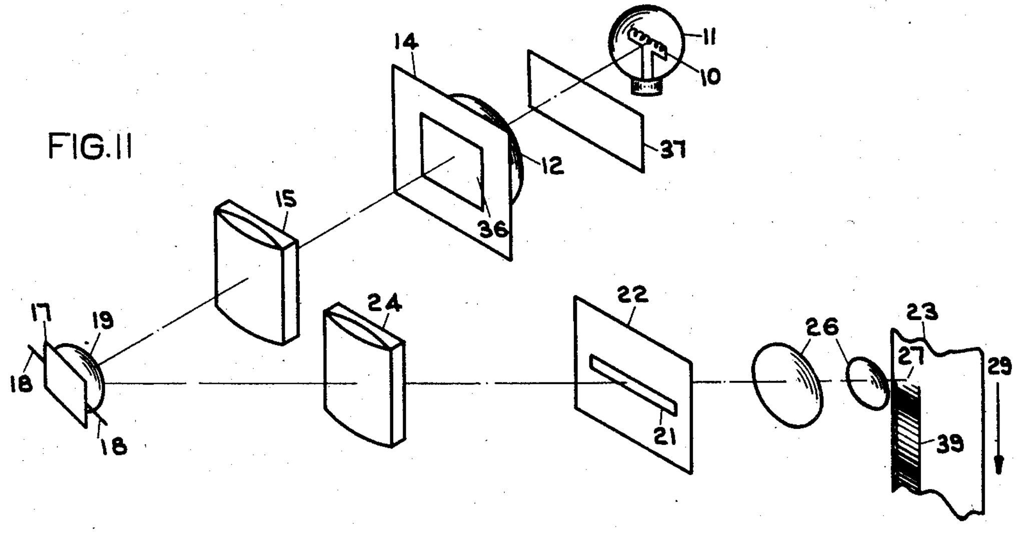
FIG. 12
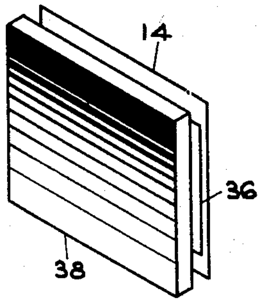
FIG. 18
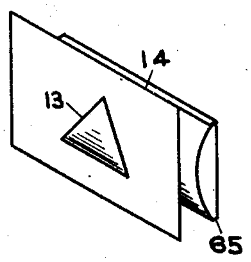
FIG. 19
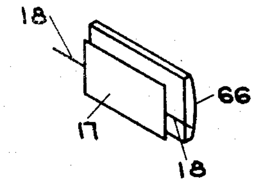
FIG. 20
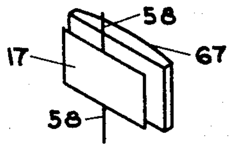
INVENTOR
JOHN A. MAURER, JR.
BY Otto J. Nathansohn
AGENT

IMPULSE RECORDING OPTICAL SYSTEM

Original Filed Aug. 2, 1940 5 Sheets-Sheet 4

INVENTOR
JOHN A. MAURER, JR.
BY Otto J. Nathansohn
AGENT

FIG. 16: PRIOR ART, HORIZONTAL PLANE
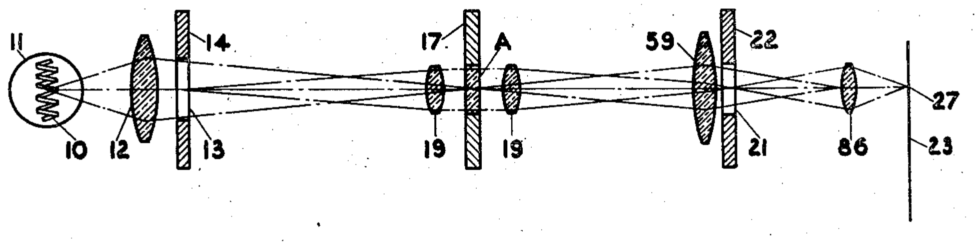
FIG. 17A: PRIOR ART, VERTICAL PLANE
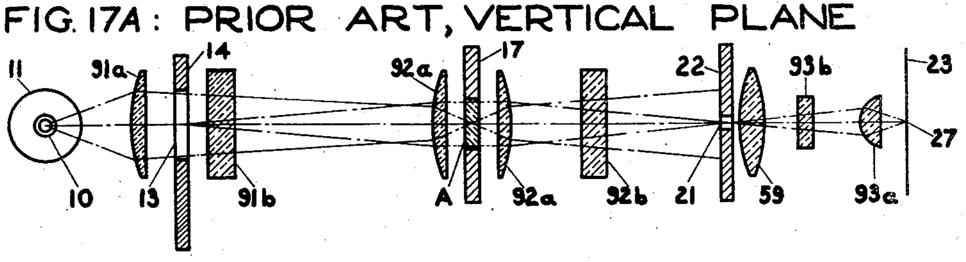
FIG. 17B: PRIOR ART, HORIZONTAL PLANE
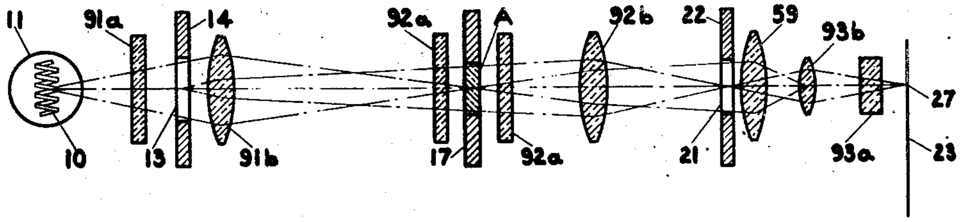
INVENTOR
JOHN A. MAURER, JR.
BY Otto J. Nattenson
AGENT Patented Feb. 6, 1951 2,540,626

UNITED STATES PATENT OFFICE 2,540,626

IMPULSE RECORDING OPTICAL SYSTEM

John A. Maurer, Jr., New York, N. Y., assignor to J. A. Maurer, Inc., New York, N. Y., a corporation of New York Original application August 2, 1940, Serial No. 349,515. Divided and this application November 21, 1944, Serial No. 564,452

9 Claims. (Cl. 88—24)

Figure 1:
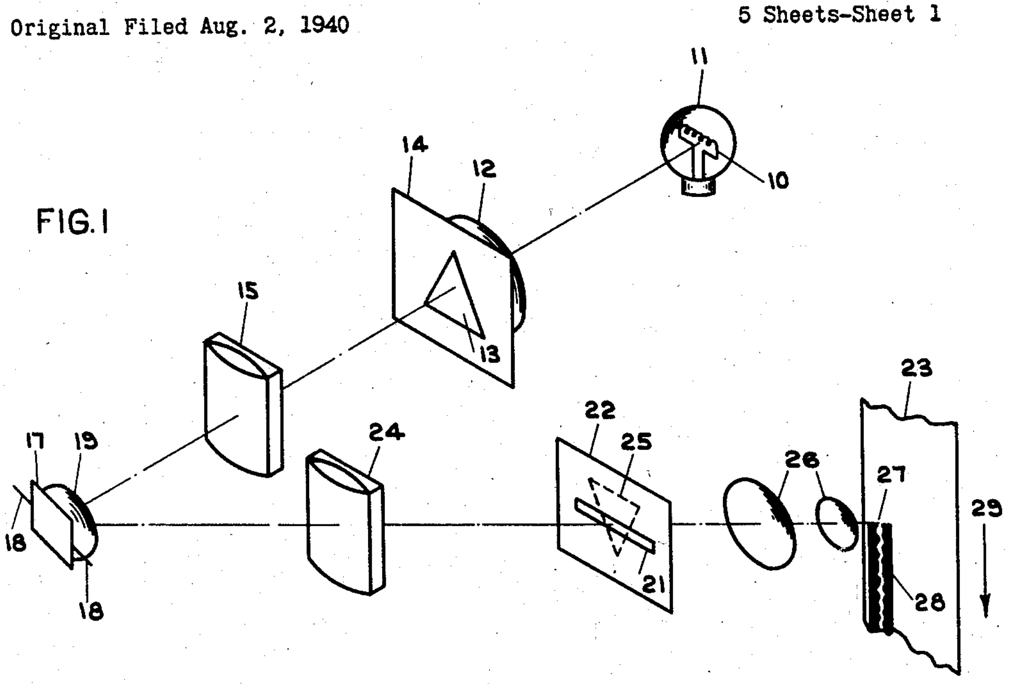

This invention relates to optical systems for the photographic recording of electrical impulses on a moving film such as are used in sound recording, picture transmission, and the like, and this application is a division of my application Serial No. 349,515, filed August 2, 1940, now abandoned, which was also assigned to J. A. Maurer, Inc.

More particularly, the invention relates to optical systems of the class referred to above wherein a small mirror vibrated by an oscillograph galvanometer, or a similar device for translating electrical impulses into mechanical vibrations, modulates a light beam in accordance with the electrical impulses to be recorded. To that end, an opening in a screen is illuminated by light flux from the recording light source, such as the filament of an incandescent lamp, and an image of the illuminated opening is formed in the plane of a horizontal slit where it, in its turn, illuminates a portion of the slit. The image of the opening is moved by the vibration of the oscillograph mirror either vertically across the slit or in a horizontal direction lengthwise of the slit. In this manner, the illuminated portion of the slit is varied in length or in illumination. The slit, furthermore, is imaged at the recording point by a lens, or lens system, with respect to which the recording point is conjugate to the slit in the two co-ordinate planes of the optical system. The recording point is the point at which the optical axis of the system strikes the film, and the film moves past the recording point in a substantially vertical direction.

The mirror oscillograph recording optical systems known heretofore, however, have the disadvantage that the light flux from the recording light source is not efficiently utilized therein. Since the imagery of the illuminated opening in the plane of the slit is performed in those optical systems so that the light flux emanating from the opening is diffused at the oscillograph mirror in the two co-ordinate planes, the aperture of the mirror is the limiting aperture in both co-ordinate planes. But the mirror aperture cannot be enlarged beyond a certain degree because the physical size of the mirror must be comparatively small in order to avoid distortions due to its mass. For a given recording light source, therefore, the amount of light flux reaching the slit is unduly limited in the prior art optical systems, and this limitation makes itself particularly felt when filters are used at some position in the optical system, for example, for selecting light rays of a certain wave length, or for other purposes.

Another drawback of the known mirror oscillograph recording optical systems is that a portion of the light flux from the recording light source is not effectively prevented therein from falling on parts other than the oscillograph mirror, or on the structure housing the optical system. This portion of the light flux is to some extent reflected diffusely, thus forming stray light even though the surfaces on which it is incident may be black. Such stray light is objectionable because it may cause an additional exposure of the moving film, which should be exposed only to light flux modulated by the oscillograph mirror.

It is, therefore, the primary object of the present invention to provide a mirror oscillograph recording optical system which is highly efficient as regards the utilization of the light flux from the recording light source.

Another object of the invention is the provision of such an optical system whose limiting aperture can, in one of its co-ordinate planes, be made much larger than the aperture of the oscillograph mirror.

Another object of the invention is the provision of such an optical system wherein the formation of stray light is reduced to a negligible amount.

Another object of the invention is the provision of such an optical system which is particularly satisfactory as regards ease of manufacture and convenience of adjustment.

Another object of the invention is the provision of such an optical system which may be designed very compactly.

Still other objects of the invention include those which are hereinafter stated or apparent, or which are incidental to the invention.

In order to attain its objects, the invention proposes the formation of an image of the illuminated opening in the plane of the slit by means of an imagery which is different in the two co-ordinate planes of the optical systems. In the co-ordinate plane at right angles to the axis of vibration of the oscillograph mirror, the opening is imaged immediately at the slit by the action of imaging means acting in that plane in which, therefore, the light flux from the opening is diffused at the mirror. This is necessary in order that the image of the opening may be movable by the vibration of the mirror. But in the co-ordinate plane which contains the axis of vibration of the mirror, an intermediate image of the opening is formed substantially on the mirror, and this intermediate image is imaged at the slit. The intermediate image is formed by first imaging means and imaged by second imaging means both of which act in only the last mentioned plane. One of the conjugate foci of the second imaging means, therefore, coincides with one of the conjugate foci of the first imaging means. Thus, the mirror is substantially at a common focus of two imaging means which act in only the co-ordinate plane containing its axis. In this plane, therefore, the amount of light flux arriving at the slit from the opening is limited not by the aperture of the mirror, but rather by the aperture of the second imaging means, and the latter aperture can be made considerably larger than the aperture which it is practical to give to the mirror.

The opening, in its turn, is illuminated by light flux from the recording light source an image of which is formed substantially on the oscillograph mirror by the action of a condenser lens in the plane at right angles to the mirror axis. Thus, there is formed substantially on the mirror an image of the recording light source and, simultaneously, the intermediate image of the opening illuminated by that light source. Substantially all the light flux entering the optical system through the opening hence is controlled by the mirror whereby the formation of stray light is reduced to a negligible amount.

In the foregoing brief explanation of the state of the art and summary of the invention, and throughout the present specification, the term "co-ordinate planes" designates two planes at right angles to each other whose line of intersection is the optical axis of the systems. As already stated hereinabove, the one of the co-ordinate planes contains the axis of vibration of the oscillograph mirror so that the other co-ordinate plane is at right angles also to the mirror axis. As likewise stated hereinabove, the slit employed in the optical systems extends horizontally, while the film moves past the recording point in a substantially vertical direction. The co-ordinate plane which contains the slit and is at right angles to the direction of the film movement at the recording point, hence is the horizontal plane, while the co-ordinate plane at right angles to the horizontal plane is the vertical plane. Either the vertical or the horizontal plane may contain the mirror axis, as will be shown hereinbelow. The plane of the slit, finally, is the plane which contains the slit, and is at right angles to both the vertical and horizontal planes.

In the present specification, the terms "vertical" and "horizontal" thus are not used in any absolute sense but merely in order to distinguish between two directions, or planes, at right angles to one another, and choice between those terms has been determined solely by convenience in description and illustration.

The invention will be better understood when the following description is considered with the accompanying drawings of certain presently preferred embodiments thereof, and its scope will be pointed out in the appended claims.

Figure 2:
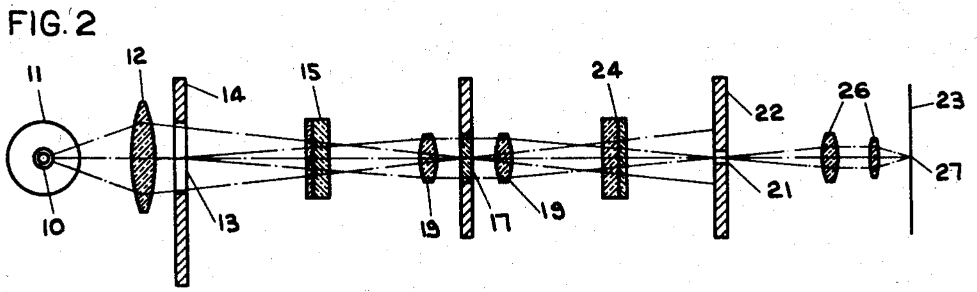
Figure 3:
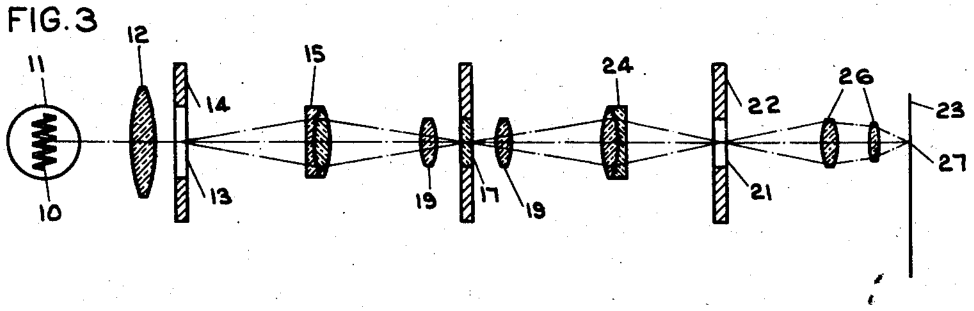
Figure 4:
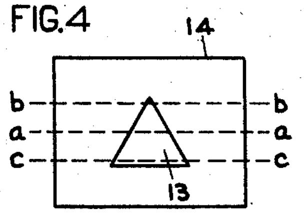
Figure 13:
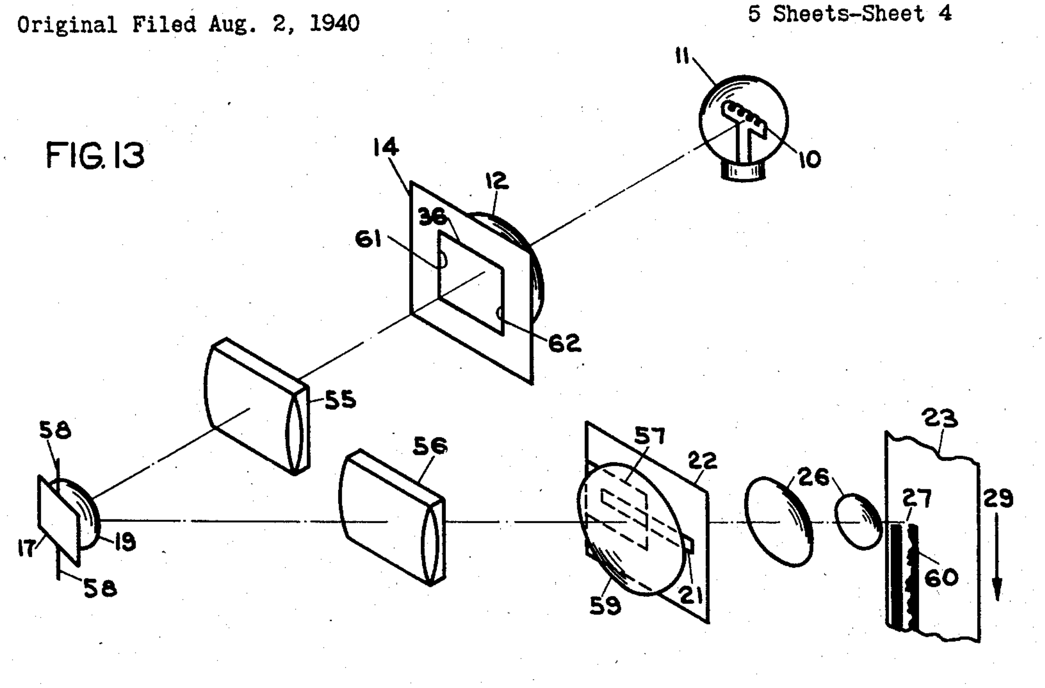
Figure 14:
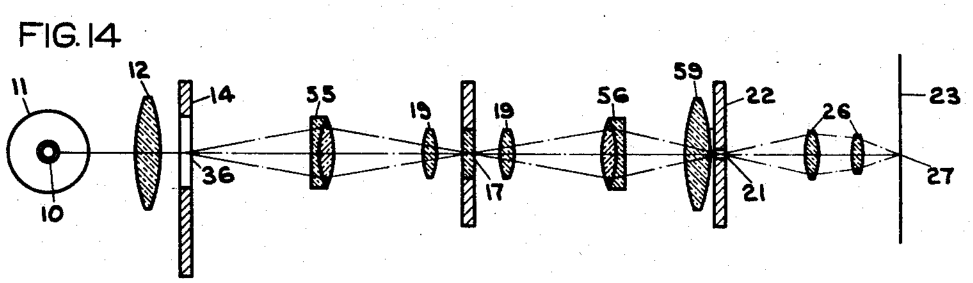
Figure 15:
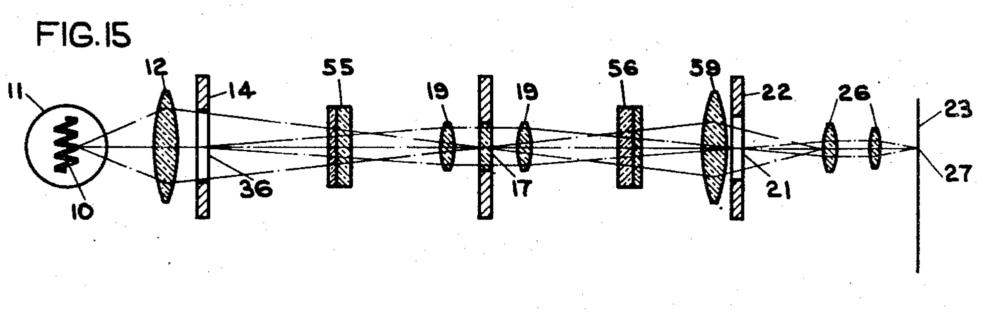

In the drawings:

Fig. 1 is a diagrammatic perspective view of an optical system wherein the invention has been embodied, Fig. 2 is a diagrammatic longitudinal section in the vertical plane of the optical system shown in Fig. 1, the optical axis being represented as a straight line and an oscillograph mirror as an aperture, Fig. 3 is a corresponding section in the horizontal plane, Fig. 4 is an elevation of a part of the optical system of Figs. 1 to 3, Figs. 5 to 10*a* show in elevation modifications of the part shown in Fig. 4, Fig. 11 is a diagrammatic perspective view of a modification of the optical system shown in Figs. 1 to 3, Fig. 12 is a perspective view of a modification of a part shown in Fig. 11, Fig. 13 is a diagrammatic perspective view of another optical system wherein the invention has been embodied, Fig. 14 is a diagrammatic longitudinal section in the vertical plane of the optical system shown in Fig. 13, the optical axis being represented as a straight line and an oscillograph mirror as an aperture, Fig. 15 is a corresponding section in the horizontal plane, Fig. 16 is a corresponding section in the horizontal plane of a prior art optical system, Figs. 17A and 17B are corresponding sections in the vertical and horizontal planes, respectively, of another prior art optical system, Fig. 18 is a perspective view of a modification of another part of the optical system shown in Figs. 1 to 3, Figs. 19 and 20 are perspective views of modifications of a part common to the optical systems of Figs. 1 to 3 and Figs. 13 to 15, and Fig. 21 is a diagrammatic longitudinal section in the vertical plane of another modification of the optical system of Figs. 1 to 3.

Referring first to Figs. 1 to 3, the invention is shown therein as embodied, by way of example, in a variable area recording optical system. The optical system has a light source such as the filament 10 of an incandescent lamp 11. The light flux from lamp filament 10 uniformly illuminates a triangular opening 13 in a screen 14 so that a uniformly illuminated triangular light spot is formed at screen 14. The light beam defined by lamp filament 10 and opening 13 proceeds through the optical system and is deflected by the mirror 17 of an oscillograph galvanometer (not shown) or similar device for translating electrical impulses into mechanical vibrations. It thus has a part which is incident from opening 13 upon mirror 17, and a part which is reflected from mirror 17 towards the recording point 27. Recording point 27 is the point at which the optical axis of the system strikes the film 23, and film 23 moves past recording point 27 in a substantially vertical direction as indicated by the arrow 29.

More particularly, opening 13 is an isosceles triangle whose base extends horizontally, and mirror 17 is adapted to vibrate about an axis 18—18 which likewise extends horizontally. Furthermore, a horizontal slit 21 is formed in a screen 22 which is placed between mirror 17 and recording point 27.

A spherical condenser lens 12 is placed between lamp 11 and screen 14, and a cylindrical lens 15 which has its cylinder axis vertical, is placed between screen 14 and mirror 17. In front of mirror 17 there is placed a spherical lens 19 which acts on the reflected as well as the incident part of the light beam proceeding through the optical system. A second cylindrical lens 24 which also has its cylinder axis vertical, is placed between mirror 17 and screen 22, while between screen 22 and recording point 27 there is placed a spherical lens system 26 which may be of the type usually employed as a microscope objective.

These five imaging means have focal lengths relative to the other parts of the optical system as follows (see Figs. 2 and 3):

Spherical lens 12 has one of its conjugate foci at lamp filament 10, and the other substantially at mirror 17, that is, either on mirror 17 or at a position close thereto. Cylindrical lens 15 has one of its conjugate foci at opening 13, and the other substantially at mirror 17 so that an intermediate image of opening 13 is formed substantially on mirror 17. Spherical lens 19 has one of its conjugate foci at opening 13, and the other at slit 21. Cylindrical lens 24 has one of its conjugate foci at the intermediate image of opening 13, and the other at slit 21. Microscope objective 26, finally, has one of its conjugate foci at slit 21, and the other at recording point 27.

It will thus be seen that, since microscope objective 26 is a spherical lens system, recording point 27 is conjugate to slit 21 in the two coordinate planes of the optical system of Figs. 1 to 3 and, furthermore, that slit 21 is illuminated in this optical system by means of the following imagery:

In the vertical plane (Fig. 2), spherical lens 19 forms an image of the uniformly illuminated opening 13 in the plane of the horizontal slit 21. Likewise in the vertical plane, spherical lens 12 forms an image of lamp filament 10 substantially on mirror 17, thereby filling mirror 17 with light and also aiding in the uniform illumination of opening 13 by lamp filament 10.

In the horizontal plane (Fig. 3), cylindrical lens 15 forms substantially on mirror 17 the intermediate image of opening 13, and an image of the intermediate image is formed by cylindrical lens 24 in the plane of slit 21.

Cylindrical lenses 15 and 24 do not interfere with the imagery in the vertical plane since they have their cylinder axes vertical, and hence act in only the horizontal plane. Spherical lenses 12 and 19, in their turn, have power also in the horizontal plane. But their actions in this plane can be disregarded for the following reasons:

On account of its position and relative focal length, spherical lens 12 tends to image lamp filament 10 substantially on mirror 17 also in the horizontal plane. The action, however, of cylindrical lens 15 interferes with this imagery to such an extent that it becomes immaterial for attaining the objects of the present invention. On the other hand, the power of spherical lens 19 in the horizontal plane has no effect upon the actions of cylindrical lenses 15 and 24 on account of the proximity of spherical lens 19 to mirror 17 which is, in the horizontal plane, substantially at a common focus of cylindrical lenses 15 and 24. No actions, therefore, of spherical lenses 12 and 19 have been indicated in Fig. 3.

Thus, an image 25 of opening 13 is formed in the plane of slit 21 by the action of spherical lens 19 in the vertical plane, and the actions of cylindrical lenses 15 and 24 in the horizontal plane. Slit 21, therefore, is conjugate to opening 13 in both the vertical and horizontal planes so that image 25 is a uniformly illuminated triangular light spot which illuminates a portion of slit 21. Furthermore, the light flux from opening 13 is brought to a focus substantially on mirror 17 in only the horizontal plane (see Fig. 3), while it is diffused at mirror 17 in the vertical plane (see Fig. 2), that is, the plane through which the light beam is deflected when mirror 17 vibrates about the horizontal axis 18—18. Image 25 hence is moved vertically across slit 21 by the vibration of mirror 17, whereby the illuminated portion of slit 21 is varied in length. [If the light flux from opening 13 were brought to a focus at mirror 17 in the vertical plane, or in both the vertical and horizontal planes, image 25 would not move at all, as will readily be understood by those skilled in the art.]

As seen from microscope objective 26, therefore, the illuminated portion of slit 21 is a horizontal line of light whose illumination is uniform, but whose length varies at both its ends in accordance with the vibration of mirror 17. By the action of microscope objective 26 in both the vertical and horizontal planes, this line of light is reproduced at recording point 27. It there exposes film 23 so that the symmetrical variable area track 28 is produced thereon.

The adjustment, finally, of mirror 17 about its horizontal axis 18—18 is as follows:

In the vertical plane, horizontal slit 21 is, with respect to spherical lens 19, conjugate to a horizontal line through opening 13. The particular horizontal line to which slit 21 is conjugate, is determined by the angle of inclination of mirror 17. Normally, therefore, mirror 17 is adjusted so that at its rest position, that is, when no electrical impulses are applied to the oscillograph galvanometer on which it is mounted, slit 21 is conjugate to the broken line *a—a*, shown in Fig. 4, which passes through opening 13 halfway between its tip and its base. When then the electrical impulses to be recorded are applied in known manner to the oscillograph galvanometer, mirror 17 vibrates in accordance therewith so that, when the amplitude of its vibration is a maximum, slit 21 is conjugate to the broken line *b—b* at the one extreme of its motion, and to the broken line *c—c* at the other extreme thereof; see Fig. 4.

Opening 13 in screen 14 is shown in Figs. 1 and 4, and has been described hereinabove, as being an isosceles triangle whose base extends horizontally. However, any other opening whose horizontal extension varies in a vertical direction, may be substituted for opening 13 to produce a variable area track on film 23. For example, the opening in screen 14 may be a right-angled triangle with one of the sides adjacent to the right angle extending horizontally as is the opening 30 shown in Fig. 5, or there may one or more sawtooth projections extend into it as they do into the openings 31 and 32 shown in Figs. 6 and 7, respectively.

As has already been pointed out hereinabove, the illuminated portion of slit 21 is in the case of opening 13 a horizontal line of light whose length varies at both its ends, so that the symmetrical variable area track 28 is produced on film 23 in this case. With opening 30, on the other hand, the illuminated portion of slit 21 is a horizontal line of light whose length varies at only one of its ends, so that the variable area track on film 23 is of the unilateral type as is the track 60 shown in Fig. 13. With opening 31, furthermore, two horizontal lines of light, each varying in length at only one of its ends, appear at screen 22 so that two unilateral variable area tracks are produced on film 23. With opening 32, finally, there appear at screen 22 three horizontal lines of light, each varying in length at both its ends, so that three symmetrical variable area tracks are simultaneously produced on film 23.

Figure 8:
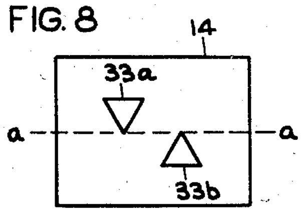
Figure 9:
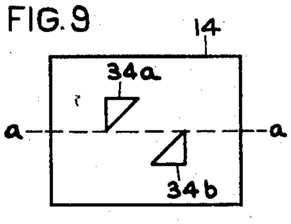
Figure 10:
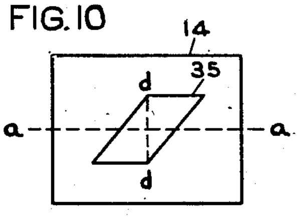
Figure 10A:
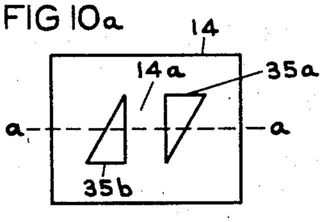

Tracks of the type known as "push-pull" may also be produced on film 23 by combining in screen 14 two openings of the kind described hereinabove. For example, the two openings may be two isosceles triangles 33a and 33b arranged as shown in Fig. 8, or two right-angled triangles 34a and 34b arranged as shown in Fig. 9. With openings 33a and 33b, a class B push-pull symmetrical variable area track is produced, and with openings 34a and 34b a class B push-pull unilateral variable area track. Class A push-pull variable area tracks may be produced, for example, by providing in screen 14 two right-angled triangles adjacent to each other along a common side d—d so that together they form a parallelogram 35, as shown in Fig. 10. In a preferred arrangement for the production of class A push-pull variable area tracks, however, a portion 14a of screen 14 separates the two right-angled triangles 35a and 35b, as shown in Fig. 10a.

As in Fig. 4, the broken line a—a indicates also in Figs. 5 to 10a the horizontal line through the opening, or openings, in screen 14 which is normally conjugate to slit 21 when mirror 17 is at rest.

Figure 5:
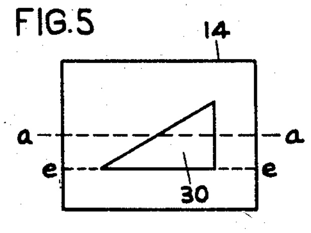
Figure 6:
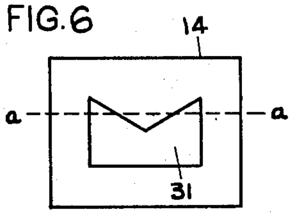
Figure 7:
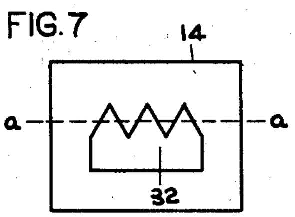

The openings of vertically varying horizontal extension shown in Figs. 4 to 10a, and described hereinabove, all are bounded by one or more straight edges which are inclined with respect to the horizontal plane of the optical system. Since, furthermore, the variation in length of the horizontal line, or lines, of light at screen 22 is effected only by those inclined edges, the lower portion of screen 14 may be omitted if desired, as indicated in Fig. 5 by the broken line e—e, for example.

When any of the openings, or pairs of openings, shown in Figs. 4 to 10a is in screen 14 and receives light flux from lamp filament 10 through spherical lens 12, there is formed at screen 14 a uniformly illuminated light spot whose horizontal extension varies in a vertical direction, or a pair of such light spots. The light flux emanating from this light spot, or these light spots, hence is vertically graded.

Light spots of vertically graded light flux, however, may also have a uniform horizontal extension and a vertically varying illumination. Means for forming a light spot of this type are well known in the art. They may consist, for example, of the means disclosed by G. L. Dimmick in his U. S. specifications 2,095,317 and 2,095,318. These means include an opening 36 which is a rectangle with one of its sides extending vertically, and a penumbra stop 37, as shown in Fig. 11. But the illumination of rectangular opening 36 may also be varied vertically by associating with opening 36 a vertically graded light shading member 38 such as is disclosed, for example, in my U. S. specification 1,955,386 and shown in Fig. 12 of this specification.

When these or other suitable means for forming a light spot of uniform horizontal extension and vertically varying illumination are substituted for opening 13 in the optical system of Figs. 1 to 3—as shown by way of example in Fig. 11—the illuminated portion of slit 21, as seen from microscope objective 26, is a horizontal line of light whose length is constant, but whose illumination varies in accordance with the vibration of mirror 17. Since this line of light is again reproduced by microscope objective 26 at recording point 27, a variable density track 39 is now produced on film 23 as it moves past recording point 27.

Whenever the optical system of Figs. 1 to 3 is employed for producing a variable area track on film 23, it is desirable that the boundary, or boundaries, between the opaque and transparent portions of which this track consists, be sharp and well defined. The horizontal line, or lines, of light formed at screen 22 and reproduced at recording point 27 must, therefore, be sharply defined at its, or their, ends. For that reason, cylindrical lenses 15 and 24, and microscope objective 26, should preferably be well corrected for spherical and chromatic aberration, and for coma. However, if these lenses are not so well corrected, the beneficial results accruing from their employment in accordance with the present invention may still be had, although to a lesser extent than if they are well corrected.

By way of further example, the invention is shown in Figs. 13 to 15 as embodied in another variable area recording optical system. In this optical system, the light flux from lamp filament 10 uniformly illuminates the rectangular opening 36 in the screen 14 so that a uniformly illuminated rectangular light spot is formed at screen 14. The light beam defined by lamp filament 10 and opening 36 proceeds through the optical system and is again deflected by the oscillograph mirror 17 so as to have a part which is incident from opening 36 upon mirror 17, and a part which is reflected from mirror 17 towards recording point 27.

More particularly, the edge 61 of opening 36 extends vertically so that the uniformly illuminated light spot at screen 14 has an edge which extends vertically, and mirror 17 is now adapted to vibrate about an axis 58—58 which likewise extends vertically. The slit 21, on the other hand, is again horizontal, and it is again formed in the screen 22 which is placed between mirror 17 and recording point 27.

Spherical condenser lens 12 and spherical lens 19 are again placed adjacent to screen 14 and in front of mirror 17, respectively, and the microscope objective 26 is again placed between screen 22 and recording point 27. Lenses 12, 19, and 26, also have the same relative focal lengths as in the case of the optical system of Figs. 1 to 3. That is to say, spherical lens 12 has one of its conjugate foci at lamp filament 10 and the other substantially at mirror 17, spherical lens 19 has one of its conjugate foci at opening 36 and the other at slit 21, and microscope objective 26 has one of its conjugate foci at slit 21 and the other at recording point 27; see Figs. 14 and 15. Recording point 27 thus is again conjugate to slit 21 in the two co-ordinate planes of the optical system.

In addition to lenses 12, 19, and 26, however, there are three more imaging means provided in the optical system of Figs. 13 to 15. A cylindrical lens 55 which has its cylinder axis horizontal, is placed between screen 14 and mirror 17, and a cylindrical lens 56 which likewise has its cylinder axis horizontal, is placed between mirror 17 and screen 22, while a spherical lens 59 is placed adjacent to screen 22. Cylindrical lens 55 has one of its conjugate foci at opening 36, and the other substantially at mirror 17 so that an intermediate image of opening 36 is formed substantially on mirror 17. Cylindrical lens 56 has one of its conjugate foci at the intermediate image of opening 36, and the other at slit 21. Spherical lens 59, finally, has one of its conjugate foci at mirror 17, and the other substantially at microscope objective 26; see Figs. 14 and 15.

By virtue of the above arrangement, slit 21 is illuminated in the optical system of Figs. 13 to 15 as follows:

In the vertical plane (Fig. 14), cylindrical lens 55 forms substantially on mirror 17 the intermediate image of the uniformly illuminated opening 36, and an image of the intermediate image is formed by cylindrical lens 56 in the plane of the horizontal slit 21.

In the horizontal plane (Fig. 15), spherical lens 19 forms an image of opening 36 in the plane of slit 21. Likewise in the horizontal plane, sperical lens 12 forms an image of lamp filament 10 substantially on mirror 17, and an image of mirror 17 is formed by sperical lens 59 on, or in the neighborhood of, microscope objective 26. The action of spherical lens 12 fills mirror 17 with light and also aids in the uniform illumination of opening 36 by lamp filament 10. The action of spherical lens 59, on the other hand, concentrates, in the horizontal plane, the light flux passing through slit 21 for any given angular position of mirror 17. This action is necessary because cylindrical lenses 55 and 56 have their cylinder axes horizontal and hence no power in the horizontal plane, which plane contains slit 21.

Since they act in only the vertical plane, cylindrical lenses 55 and 56 do not interfere with the imagery in the horizontal plane. Spherical lenses 12 and 19, in their turn, have power also in the vertical plane. But their actions in this plane can be disregarded for the reasons set forth hereinabove with respect to their actions in the horizontal plane of the optical system of Figs. 1 to 3. No actions, therefore, of spherical lenses 12 and 19 have been indicated in Fig. 14. The action, finally, of spherical lens 59 in the vertical plane is barred by screen 22. Spherical lens 59 hence may be replaced by a cylindrical lens having the same relative focal length and aperture, and having its cylinder axis vertical so that it acts in only the horizontal plane.

Thus, an image 57 of opening 36 is formed in the plane of slit 21 by the actions of cylindrical lenses 55 and 56 in the vertical plane, and the action of spherical lens 19 in the horizontal plane. Slit 21, therefore, is conjugate to opening 36 in both the vertical and horizontal planes so that image 57 is a uniformly illuminated rectangular light spot which illuminates a portion of slit 21. Furthermore, the light flux from opening 36 is brought to a focus substantially on mirror 17 in only the vertical plane (see Fig. 14), while it is diffused at mirror 17 in the horizontal plane (see Fig. 15), that is, the plane through which the light beam is deflected when mirror 17 vibrates about the vertical axis 58—58. Image 57 hence is moved in a horizontal direction lengthwise of slit 21 by the vibration of mirror 17, whereby the illuminated portion of slit 21 is varied in length. There thus appears at screen 22 again a horizontal line of light whose illumination is uniform, but whose length varies at one of its ends in accordance with the vibration of mirror 17. This line of light is again reproduced at recording point 27 by the action of microscope objective 26 in both the vertical and horizontal planes. Moreover, film 23 moves past recording point 27 again in a substantially vertical direction as indicated by the arrow 29 so that the unilateral variable area track 60 is now produced on film 23. When, therefore, the electrical impulses to be recorded are applied in known manner to the oscillograph galvanometer on which mirror 17 is mounted, track 60 is a record of those impulses.

The length of the line of light at screen 22 varies at only one of its ends because the optical system is shown in Fig. 13 as being adjusted so that the image of only the vertical edge 61 of opening 36 intersects slit 21. However, the optical system may also be designed and adjusted so that the images of both vertical edges 61 and 62 of opening 36 intersect slit 21, in which case a class A push-pull variable area track is produced on film 23.

In place of rectangular opening 36, screen 14 may, in the optical system of Figs. 13 to 15, have any other opening permitting the formation, in the manner described hereinabove, of an image thereof whose movement lengthwise of slit 21 varies the length of the illuminated portion of slit 21. All that is required to accomplish that end, is that the opening in screen 14 have at least one edge whose image transversely intersects slit 21, and this edge need not be straight, as are edges 61 and 62, but may be curved or even ragged, if desired.

The two optical systems of Figs. 1 to 3 and Figs. 13 to 15 thus are alike in that in both of them recording point 27 is conjugate to horizontal slit 21, and slit 21 to an illuminated opening in screen 14, in the two co-ordinate planes. An image of the opening, therefore, is formed in the plane of slit 21, and this image is obtained by means of an imagery whose novelty resides in the fact that it is different in the two co-ordinate planes. In the co-ordinate plane at right angles to the axis of vibration of mirror 17 the opening is imaged immediately at slit 21 by the action of imaging means acting in that plane. But in the co-ordinate plane which contains the mirror axis, an intermediate image of the opening is formed substantially on mirror 17. and this intermediate image is imaged at slit 21, the intermediate image being formed by imaging means acting in only the last mentioned plane and being imaged by such means. Since, for example, mirror axis 18—18 is horizontal, opening 13 is, in the optical system of Figs. 1 to 3, imaged immediately at slit 21 by the action of spherical lens 19 in the vertical plane, while an intermediate image of opening 13 is formed substantially on mirror 17 by cylindrical lens 15 and imaged at slit 21 by cylindrical lens 24, which two cylindrical lenses act in only the horizontal plane. Since, on the other hand, mirror axis 58—58 is vertical, opening 36 is, in the optical system of Figs. 13 to 15, imaged immediately at slit 21 by the action of spherical lens 19 in the horizontal plane, while an intermediate image of opening 36 is formed substantially on mirror 17 by cylindrical lens 55 and imaged at slit 21 by cylindrical lens 56, which two cylindrical lenses act in only the vertical plane.

As has been set forth hereinabove, the opening in screen 14 must be imaged immediately at slit 21 in the co-ordinate plane at right angles to the axis of mirror 17 because the light flux from the opening must, in this plane, be diffused at mirror 17 in order that the image of the opening may be movable by the vibration of mirror 17. That it is highly desirable to form, in the co-ordinate plane containing the axis of mirror 17, an intermediate image of the opening substantially on mirror 17 and to image this intermediate image at slit 21, will now be shown:

In the co-ordinate plane containing the axis of mirror 17, the intermediate image is formed substantially on mirror 17 by cylindrical lenses 15 and 55, respectively, and imaged at slit 21 by cylindrical lenses 24 and 56, respectively. The cylinder axes of lenses 15 and 24 are at right angles to mirror axis 18—18, and the cylinder axes of lenses 55 and 58 are at right angles to mirror axis 58—58. Mirror 17 thus is substantially at a common focus of two imaging means which act in only the co-ordinate plane containing its axis. In this plane, therefore, the amount of light flux arriving at slit 21 from the opening in screen 14 is limited—for any given angle of inclination of mirror 17—not by the aperture of mirror 17, but rather by the aperture of the second imaging means, that is, either cylindrical lens 24 or cylindrical lens 56. The aperture of cylindrical lenses 24 and 56, however, can be made as much as five times larger than the aperture which it is practical to give to mirror 17.

On account of the last mentioned feature, the novel imagery performed in the optical systems of Figs. 1 to 3 and Figs. 13 to 15 represents a marked advance over the mirror oscillograph recording optical systems of the prior art. In the latter optical systems, the illuminated opening is imaged immediately at the slit, and hence the light flux from the opening diffused at the oscillograph mirror, in both their co-ordinate planes. For that reason, the mirror aperture is the limiting aperture of those optical systems also in the co-ordinate plane which contains the mirror axis. Since the physical size of the oscillograph mirror must be comparatively small in order to avoid distortions due to its mass, the above condition has been a serious obstacle to an efficient utilization of the light flux in the prior art optical systems. The advantage gained in this respect by the imagery recording to the present invention is considerable because, as is well known to those skilled in the art, the efficiency with which the light flux from a given light source is utilized in an optical system, is approximately proportional to the product of the limiting apertures in the two co-ordinate planes of the optical system.

In order to elaborate on the above explanations and also to afford a convenient comparison between the imagery performed in the prior art optical systems and the imagery performed in the optical systems of Figs. 1 to 3 and Figs. 13 to 15, two prior art mirror oscillograph recording optical systems are illustrated in Fig. 16, and Figs. 17A and 17B, respectively. Figs. 16, 17A, and 17B, are diagrammatic longitudinal sections in which the optical axis is represented as a straight line and the oscillograph mirror as an aperture. In this respect, therefore, and also in all other pertinent respects, the diagrams of Figs. 16, 17A, and 17B, conform to those of Figs. 2, 3, 14, and 15. Moreover, parts employed in the prior art optical systems as well as in the optical systems of Figs. 1 to 3 and Figs. 13 to 15 are designated in Figs. 16, 17A, and 17B, by the same reference characters as in Figs. 2, 3, 14, and 15.

Referring now to Fig. 16, this figure shows the imagery most commonly performed in the prior art optical systems. Fig. 16 is a section in the horizontal plane but, since only spherical lenses are employed in the optical system, it illustrates also the imaging actions in the vertical plane except insofar as the action of spherical lens 59 in the vertical plane is barred by screen 22 in the same manner as in the optical system of Figs. 13 to 15. It will thus be seen that recording point 27 is, in the optical system of Fig. 16, again conjugate to the horizontal slit 21 in the two co-ordinate planes because the spherical lens 86 has power in both the vertical and horizontal planes. Spherical lens 19, too, has power in both the vertical and horizontal planes, and its action in either co-ordinate plane is not superseded by another imaging action as is the case in the optical systems of Figs. 1 to 3 and Figs. 13 to 15. Opening 13, therefore, now is imaged immediately at slit 21 in the two co-ordinate planes. The light flux from opening 13 thus is diffused at mirror 17 in the two co-ordinate planes so that the limiting aperture in both planes is the aperture A of mirror 17. That is to say, the aperture of spherical lens 19, as seen from slit 21, is filled with light flux from opening 13 only to the extent permitted by the size of aperture A, and this condition cannot be remedied by enlarging the aperture of spherical lens 19. But in the optical systems of Figs. 1 to 3, and Figs. 13 to 15, the aperture of cylindrical lenses 24 and 56, respectively, can be made as large as it is practical to make it. For any given size of their aperture, cylindrical lenses 24 and 56 will be completely filled with light flux from the opening in screen 14 by virtue of the fact that this light flux is focussed substantially on mirror 17 by the action of cylindrical lenses 15 and 55, respectively, in the same co-ordinate plane in which cylindrical lenses 24 and 56 act.

The prior art optical system illustrated in Figs. 17A and 17B differs from that of Fig. 16 in that the three spherical lenses 12, 19, and 86, of the latter optical system are replaced in the former optical system by three pairs of cylindrical lenses 91*a* and 91*b*, 92*a* and 92*b*, and 93*a* and 93*b*, respectively. The two cylindrical lenses of which each pair is made up, have their cylinder axes at right angles to one another and, furthermore, have the same parts of the optical system at their conjugate foci. That is to say, cylindrical lenses 91*a* and 91*b* have their cylinder axes at right angles to one another, and each lens has one of its conjugate foci at lamp filament 10 and the other at mirror 17. Cylindrical lenses 92*a* and 92*b*, in their turn, have their cylinder axes at right angles to one another, and each lens has one of its conjugate foci at opening 13 and the other at slit 21. Cylindrical lenses 93*a* and 93*b*, finally, have their cylinder axes at right angles to one another, and each lens has one of its conjugate foci at slit 21 and the other at recording point 27.

As in the optical system of Fig. 16, therefore, opening 13 is imaged in the optical system of Figs. 17A and 17B immediately at slit 21 in the two co-ordinate planes. This result is accomplished because cylindrical lens 92*a* acts in the vertical plane (Fig. 17A) and cylindrical lens 92*b* in the horizontal plane (Fig. 17B), and because both lenses have their conjugate foci at opening 13 and slit 21, respectively. The light flux from opening 13 hence is diffused at mirror 17 in both co-ordinate planes so that the aperture A of mirror 17 is the limiting aperture also in the two co-ordinate planes of the optical system of Figs. 17A and 17B. Again, this condition cannot be remedied by enlarging the apertures of cylindrical lenses 92*a* and 92*b* since these apertures, as seen from slit 21, are filled with light flux from opening 13 only to the extent permitted by the size of aperture A.

It should be noted that, on account of its position between screen 14 and mirror 17, cylindrical lens 91*b* slightly affects the action of cylindrical lens 92b; see Fig. 17B. Actually, therefore, opening 13 and slit 21 are, in the horizontal plane, at the conjugate foci of a lens combination consisting of cylindrical lenses 91b and 92b. But this does not alter the fact that the light flux from opening 13 is diffused at mirror 17 also in the horizontal plane. Since, taken by itself, cylindrical lens 91b has lamp filament 10 and mirror 17 at its conjugate foci, the combined action of cylindrical lenses 91b and 92b does not result in the formation of an intermediate image of opening 13 substantially on mirror 17. The formation of this intermediate image, however, is the only way of avoiding the diffusion of the light flux from opening 13 at mirror 17, and hence a prerequisite to the removal of aperture A as the limiting aperture in one co-ordinate plane of the optical system.

Referring now again to the optical systems of Figs. 1 to 3 and Figs. 13 to 15, another advantage of having mirror 17 substantially at a common focus of two imaging means which act in only the co-ordinate plane containing its axis, is that small deviations of mirror 17 about an axis at right angles to its axis have a negligible effect on the imagery in that plane. That is to say, mirror 17 need accurately be adjusted only about the horizontal axis 18—18 in the optical system of Figs. 1 to 3, and only about the vertical axis 58—58 in the optical system of Figs. 13 to 15. This greatly increases the ease of adjustment of the optical system, and is particularly important when it is necessary to replace the oscillograph galvanometer on which mirror 17 is mounted.

A further advantage of the novel imagery embodied, by way of example, in the optical systems of Figs. 1 to 3 and Figs. 13 to 15 results from the fact that there is formed substantially on mirror 17 an image of lamp filament 10 by the action of spherical lens 12 in the co-ordinate plane at right angles to the mirror axis, and simultaneously the intermediate image of the illuminated opening in screen 14 by the action of cylindrical lenses 15 and 55, respectively, in the co-ordinate plane containing the mirror axis. It thus is possible so to control the light flux which enters the optical systems through the opening in screen 14 that it is all incident within the working aperture of mirror 17. This result is best obtained when the focal length of spherical lens 12 and the position of lamp 11 are chosen so that, in the first mentioned plane, the image of lamp filament 10 has a dimension no larger than that of mirror 17, and when the focal length of cylindrical lenses 15 and 55, respectively, and the position of screen 14 are chosen so that, in the second mentioned plane, the largest dimension which the intermediate image may have, is no larger than the dimension of mirror 17. If these conditions are fulfilled, all the light flux passing through the opening in screen 14 is subject to control by mirror 17, whereby the formation of stray light in the optical systems is reduced to a negligible amount.

The optical systems shown in Figs. 1 to 3 and Figs. 13 to 15 as embodying the imagery according to the present invention may be modified as follows without affecting the basic principles of their operation which have been set forth hereinabove.

(1) Condenser lens 12 is shown in Figs. 1 to 3 and Figs. 13 to 15, and has been described hereinabove, as being spherical. It hence acts in the two co-ordinate planes of the optical systems. However, as has been pointed out hereinabove, its action in the co-ordinate plane which contains the axis of vibration of mirror 17, is immaterial as far as the novel imagery disclosed in this specification is concerned. Spherical condenser lens 12, therefore, may be replaced by a cylindrical condenser lens which has its cylinder axis parallel to the axis of mirror 17 and hence acts in only the co-ordinate plane at right angles to the mirror axis.

For example, in the optical system of Figs. 1 to 3 wherein mirror axis 18—18 is horizontal, spherical lens 12 may be replaced by a cylindrical lens 65 which has its cylinder axis horizontal and hence acts in only the vertical plane. Like spherical lens 12, cylindrical lens 65 has one of its conjugate foci at lamp filament 10, and the other substantially at mirror 17. Cylindrical lens 65 may, furthermore, have the same position as spherical lens 12, in which position it is shown in Fig. 18. But since it acts in only the vertical plane, it may also have any other position between lamp 11 and mirror 17 which is consistent with its function to image lamp filament 10 substantially on mirror 17. Correspondingly, spherical lens 12 may be replaced in the optical system of Figs. 13 to 15 wherein mirror axis 58—58 is vertical, by a cylindrical lens which has its cylinder axis vertical and hence acts in only the horizontal plane.

In designing an actual optical system with a cylindrical condenser lens, however, the extension of lamp filament 10 in the direction parallel to the mirror axis should be made so great that the opening in screen 14, as seen from cylindrical lenses 15 or 55, is completely filled with light.

(2) It has been explained hereinabove that, while spherical lens 19 has power in the two co-ordinate planes of the optical systems, its action in the co-ordinate plane which contains the axis of vibration of mirror 17, can be disregarded. Spherical lens 19 may therefore be replaced by a cylindrical lens which has its cylinder axis parallel to the axis of mirror 17 and hence acts in only the co-ordinate plane at right angles to that axis.

For example, in the optical system of Figs. 1 to 3 wherein mirror axis 18—18 is horizontal, spherical lens 19 may be replaced by a cylindrical lens 66 which has its cylinder axis horizontal and hence acts in only the vertical plane. Correspondingly, spherical lens 19 may be replaced in the optical system of Figs. 13 to 15 wherein mirror axis 58—58 is vertical, by a cylindrical lens 67 which has its cylinder axis vertical and hence acts in only the horizontal plane. Like spherical lens 19, cylindrical lenses 66 and 67 have one of their conjugate foci at the opening in screen 14, and the other at slit 21. Cylindrical lenses 66 and 67 may, furthermore, have the same position as spherical lens 19, in which position they are shown in Figs. 19 and 20, respectively. But since they act in only the co-ordinate plane at right angles to the axis of mirror 17, they may have any other position between screens 14 and 22 which is consistent with their function to image the opening in screen 14 in the plane of slit 21.

Spherical lens 19, on the other hand, should be placed close to mirror 17, as shown in Figs. 1 and 13, lest it interfere with the imagery in the co-ordinate plane which contains the mirror axis.

(3) When the light beam defined by lamp filament 10 and the opening in screen 14 is incident upon mirror 17 at a sufficiently small angle, the two cylindrical lenses 15 and 24, and 55 and 56, respectively, may be replaced by a single cylindrical lens which has its cylinder axis at right angles to the axis of vibration of mirror 17.

Figure 21:
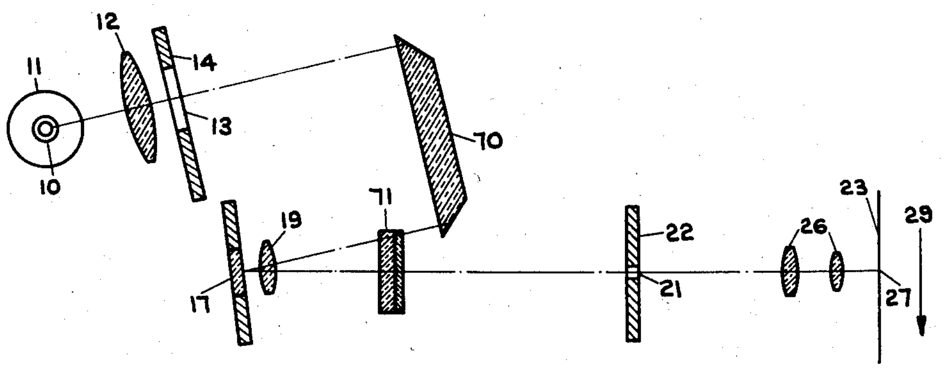

For example, in the optical system of Figs. 1 to 3 wherein mirror axis 18—18 is horizontal, cylindrical lenses 15 and 24 may be replaced by a single cylindrical lens 71 as shown in Fig. 21. Like cylindrical lenses 15 and 24, cylindrical lens 71 has its cylinder axis vertical, and it is placed so as to be traversed by the reflected as well as the incident part of the light beam proceeding through the optical system. The relative focal length of cylindrical lens 71 is so chosen that the opening in screen 14 and a position on, or close to, mirror 17 are conjugate with respect to cylindrical lens 71 on the incident part, and this position and slit 21 are conjugate with respect to cylindrical lens 71 on the reflected part of the light beam. In this manner, cylindrical lens 71 forms the intermediate image of the opening in screen 14 substantially on mirror 17 and, simultaneously, images the intermediate image in the plane of slit 21.

Correspondingly, cylindrical lenses 55 and 56 may be replaced in the optical system of Figs. 13 to 15 wherein mirror axis 58—58 is vertical, by a single cylindrical lens which has its cylinder axis horizontal.

The angle at which the light beam is incident upon mirror 17, may be made sufficiently small by considerably lengthening the optical systems mechanically. However, this end may be accomplished in a more convenient way which, at the same time, provides for a very compact mechanical design of the optical systems and which is shown in Fig. 21 as applied, by way of example, to the optical system of Figs. 1 to 3. It consists of placing a reflecting prism 70 between screen 14 and mirror 17 whereby the light beam is folded so that it is incident upon mirror 17 at a small angle and cylindrical lens 71 is traversed by both the incident and reflected parts of the light beam. In place of prism 70 there may be employed other suitable beam folding means such as mirrors, or the like.

For the reasons stated hereinabove, cylindrical lens 71 should preferably be well corrected when it is substituted for cylindrical lenses 15 and 24, and a variable area track is to be produced with the optical system of Figs. 1 to 3.

(4) If it is desired to employ the optical systems of Figs. 1 to 3 and Figs. 13 to 15 for recording sound in accordance with the method generally known as "noiseless recording," the well known ground noise reduction systems may be used in conjunction therewith, as will easily be understood by those skilled in the art.

Many other modifications of the invention will readily suggest themselves to those skilled in the art. The invention, therefore, is not to be limited, except in so far as is necessitated by the prior art and by the spirit of the appended claims.

What is claimed is:

1. In an optical system of the class described, and in which the recording point is conjugate to a slit in the two co-ordinate planes, the combination of a mirror adapted to vibrate about an axis, said axis being contained in one of said co-ordinate planes; light beam defining means which include a light source and a screen with an opening, said opening being illuminated by said light source and said light beam being deflected by said mirror so as to have a part which is incident from said opening upon said mirror, and a part which is reflected from said mirror towards said recording point; means forming said slit, said slit forming means being placed between said mirror and said recording point; and a cylindrical lens placed between said screen and said mirror, and having its cylinder axis at right angles to said axis; said cylindrical lens being traversed by said incident and reflected parts, said opening and said mirror being conjugate with respect to said cylindrical lens on said incident part, and said mirror and said slit being conjugate with respect to said cylindrical lens on said reflected part.

2. In an optical system of the class described, and in which the recording point is conjugate to a slit in the two co-ordinate planes, the combination of a mirror adapted to vibrate about an axis, said axis being contained in one of said co-ordinate planes; light beam defining means which include a light source and a screen with an opening, said opening being illuminated by said light source and said light beam being deflected by said mirror so as to have a part which is incident from said opening upon said mirror, and a part which is reflected from said mirror towards said recording point; means forming said slit, said slit forming means being placed between said mirror and said recording point; means placed between said screen and said mirror for folding said incident part; and a cylindrical lens placed between said folding means and said mirror, and having its cylinder axis at right angles to said axis: said cylindrical lens being traversed by said incident and reflected parts, said opening and said mirror being conjugate with respect to said cylindrical lens on said incident part, and said mirror and said slit being conjugate with respect to said cylindrical lens on said reflected part.

3. In an optical system of the class described, and in which the recording point is conjugate to a horizontal slit in both the vertical and horizontal planes, the combination of a mirror adapted to vibrate about a horizontal axis; light beam defining means which include means for forming a light spot of vertically graded light flux, said light beam being deflected by said mirror so as to have a part which is incident from said light spot upon said mirror, and a part which is reflected from said mirror towards said recording point; means placed between said light spot and said mirror for folding said incident part; means placed between said mirror and said recording point, and forming said slit; a cylindrical lens placed between said folding means and said mirror and between said mirror and said slit forming means, said cylindrical lens having its cylinder axis vertical and being traversed by said incident and reflected parts; and imaging means placed in front of said mirror and acting in the vertical plane: said light spot and said mirror being conjugate with respect to said cylindrical lens on said incident part, said mirror and said slit being conjugate with respect to said cylindrical lens on said reflected part, and said light spot and said slit being conjugate with respect to said imaging means.

4. In an optical system of the class described, and in which the recording point is conjugate to a horizontal slit in both the vertical and horizontal planes, the combination of means for forming a light spot of vertically graded light flux; a mirror adapted to vibrate about a horizontal axis; means forming said slit; first imaging means placed between said light spot and said mirror, and having first and second conjugate foci; second imaging means placed between said mirror and said slit forming means, and having third and fourth conjugate foci; and third imaging means placed in front of said mirror, and having fifth and sixth conjugate foci: said first imaging means acting in only the horizontal plane and having said first focus at said light spot, and said second focus substantially at said mirror so that an intermediate image of said light spot is formed substantially on said mirror; said second imaging means acting in only the horizontal plane and having said third focus at said intermediate image, and said fourth focus at said slit; and said third imaging means acting in the vertical plane and having said fifth focus at said light spot, and said sixth focus at said slit.

5. The combination defined in claim 4 wherein said first imaging means is a cylindrical lens having its cylinder axis vertical.

6. The combination defined in claim 4 wherein said first and second imaging means are each a cylindrical lens having its cylinder axis vertical.

7. The combination defined in claim 4 wherein said third imaging means is a spherical lens.

8. The combination defined in claim 4 wherein said first and second imaging means are each a cylindrical lens having its cylinder axis vertical, and said third imaging means is a spherical lens.

9. In an optical system, the combination of a light source; a screen with an opening whose horizontal extension varies in a vertical direction, said opening being uniformly illuminated by said light source; a mirror adapted to vibrate about a horizontal axis; means forming a slit which extends horizontally; a recording point past which a film may move in a substantially vertical direction; a first spherical lens placed adjacent to said screen, and having first and second conjugate foci; a first cylindrical lens placed between said screen and said mirror, and having third and fourth conjugate foci; a second cylindrical lens placed between said mirror and said slit forming means, and having fifth and sixth conjugate foci; a second spherical lens placed in front of said mirror, and having seventh and eighth conjugate foci; and a microscope objective placed between said slit forming means and said recording point, and having ninth and tenth conjugate foci: said first spherical lens having said first focus at said light source, and said second focus substantially at said mirror; said first cylindrical lens having its cylinder axis vertical and having said third focus at said opening, and said fourth focus substantially at said mirror so that an intermediate image of said opening is formed substantially on said mirror; said second cylindrical lens having its cylinder axis vertical and having said fifth focus at said intermediate image, and said sixth focus at said slit; said second spherical lens having said seventh focus at said opening, and said eighth focus at said slit; and said microscope objective having said ninth focus at said slit, and said tenth focus at said recording point.

JOHN A. MAURER, Jr.

REFERENCES CITED

The following references are of record in the file of this patent:

UNITED STATES PATENTS

| Number | Name | Date |
|---|---|---|
| 1,847,636 | Taylor | Mar. 1, 1932 |
| 1,999,721 | Dimmick | Apr. 30, 1935 |
| 2,036,622 | Emmerich | Apr. 7, 1936 |
| 2,052,220 | Dimmick | Aug. 25, 1936 |
| 2,121,568 | Newcomer | June 21, 1938 |
| 2,125,890 | Cook | Aug. 9, 1938 |
| 2,157,166 | Dimmick | May 9, 1939 |
| 2,173,681 | Dimmick | Sept. 19, 1939 |
| 2,256,402 | McLeod | Sept. 16, 1941 |